United States Patent [19]

Dixon

[11] Patent Number: 4,487,541
[45] Date of Patent: Dec. 11, 1984

[54] MACHINE FOR HANDLING PARTS

[76] Inventor: Paul H. Dixon, Belvidere, Ill.

[21] Appl. No.: 305,912

[22] Filed: Sep. 28, 1981

[51] Int. Cl.³ .............................................. B65H 5/00
[52] U.S. Cl. .................................. 414/225; 198/486;
   414/224; 414/589; 414/750
[58] Field of Search ............... 414/749, 750, 751, 771,
   414/782, 696, 680–682, 589, 733, 222, 225, 224;
   308/6 R, 182, 203; 74/569; 198/486, 488

[56] References Cited

U.S. PATENT DOCUMENTS

| | | | |
|---|---|---|---|
| 3,114,477 | 12/1963 | Dixon | 221/238 |
| 3,279,045 | 10/1966 | Dixon | 29/211 |
| 3,675,302 | 7/1972 | Dixon | 29/211 |
| 4,002,247 | 1/1977 | Dixon | 214/1 |

Primary Examiner—Robert J. Spar
Assistant Examiner—Donald W. Underwood

[57] ABSTRACT

A gripping mechanism is mounted on a carriage and is adapted to be shifted back and forth along an inverted L-shaped path to pick up and transfer parts. Inverted L-shaped cam tracks are formed in a main support member and receive and guide rollers which support the carriage. The cam tracks and the rollers are arranged to allow the rollers to roll freely without skidding while preventing radial play between the rollers and the tracks. A flexible drive linkage is connected between the carriage and its actuator and is capable of yielding in both directions in order to prevent damage to the actuator if the carriage becomes jammed when the carriage is being either advanced or retracted. Before being picked up by the gripping mechanism, the parts are held in a track by an escapement having spring-biased fingers adapted to move between open and closed positions.

6 Claims, 13 Drawing Figures

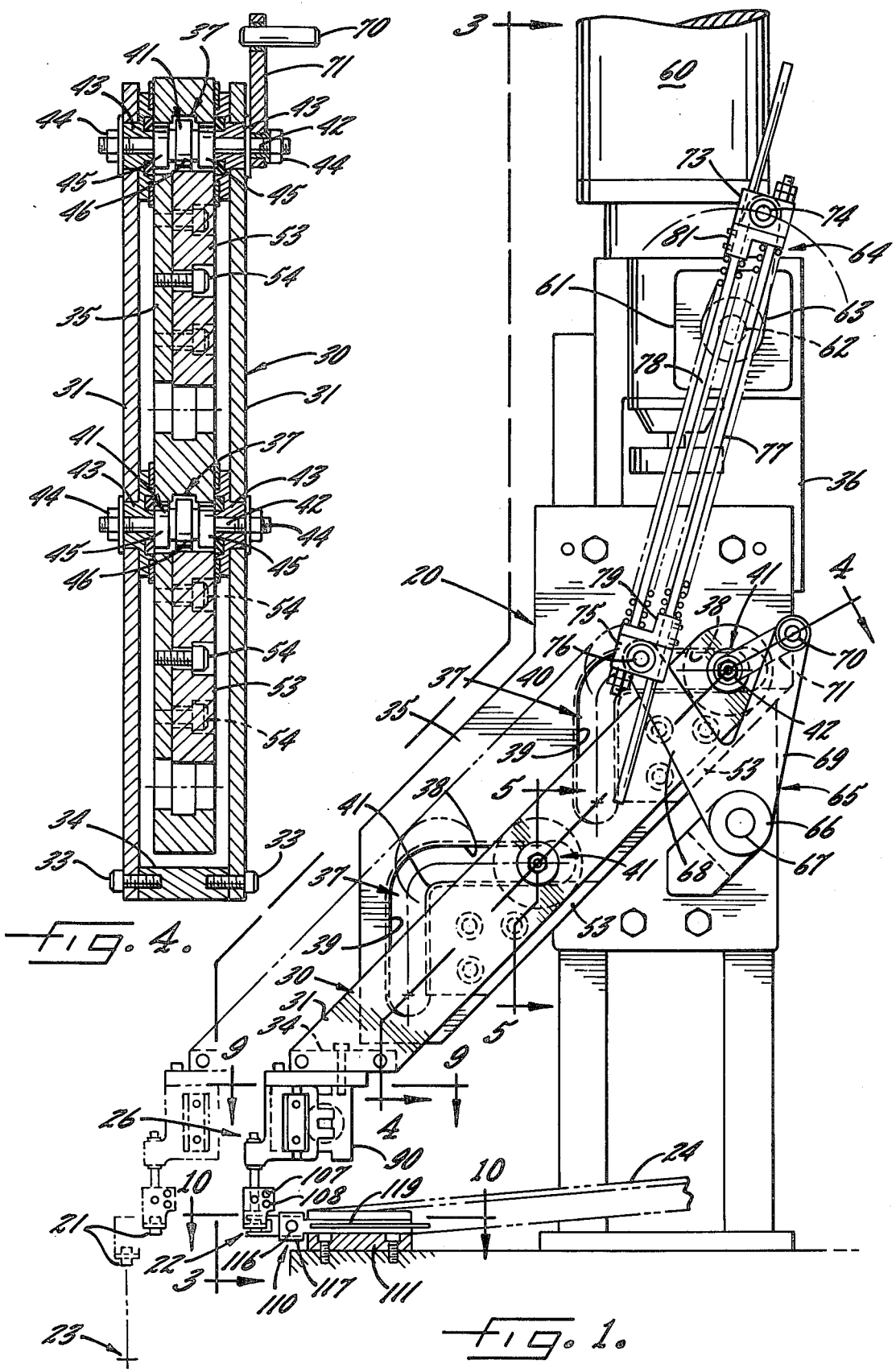

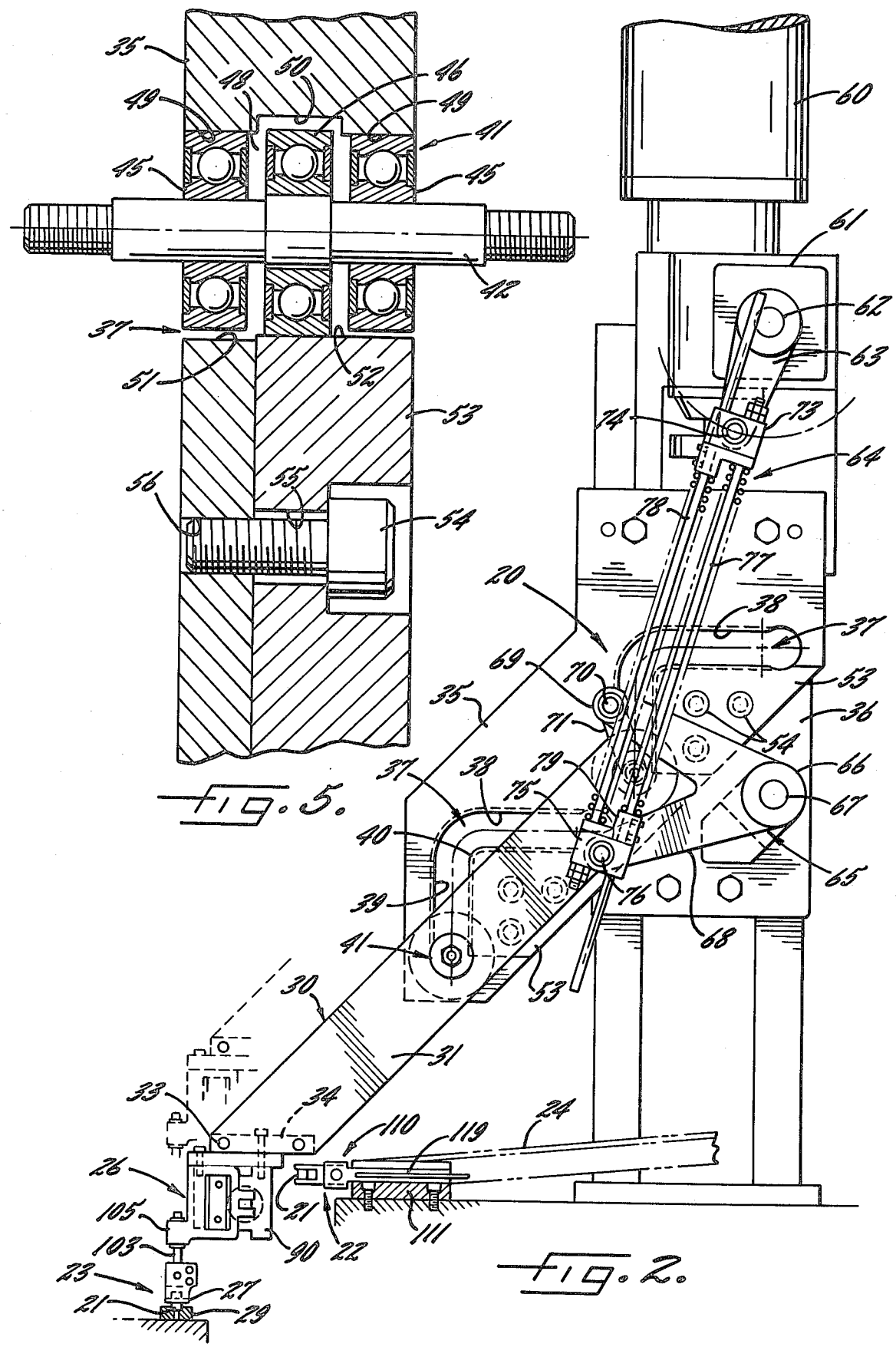

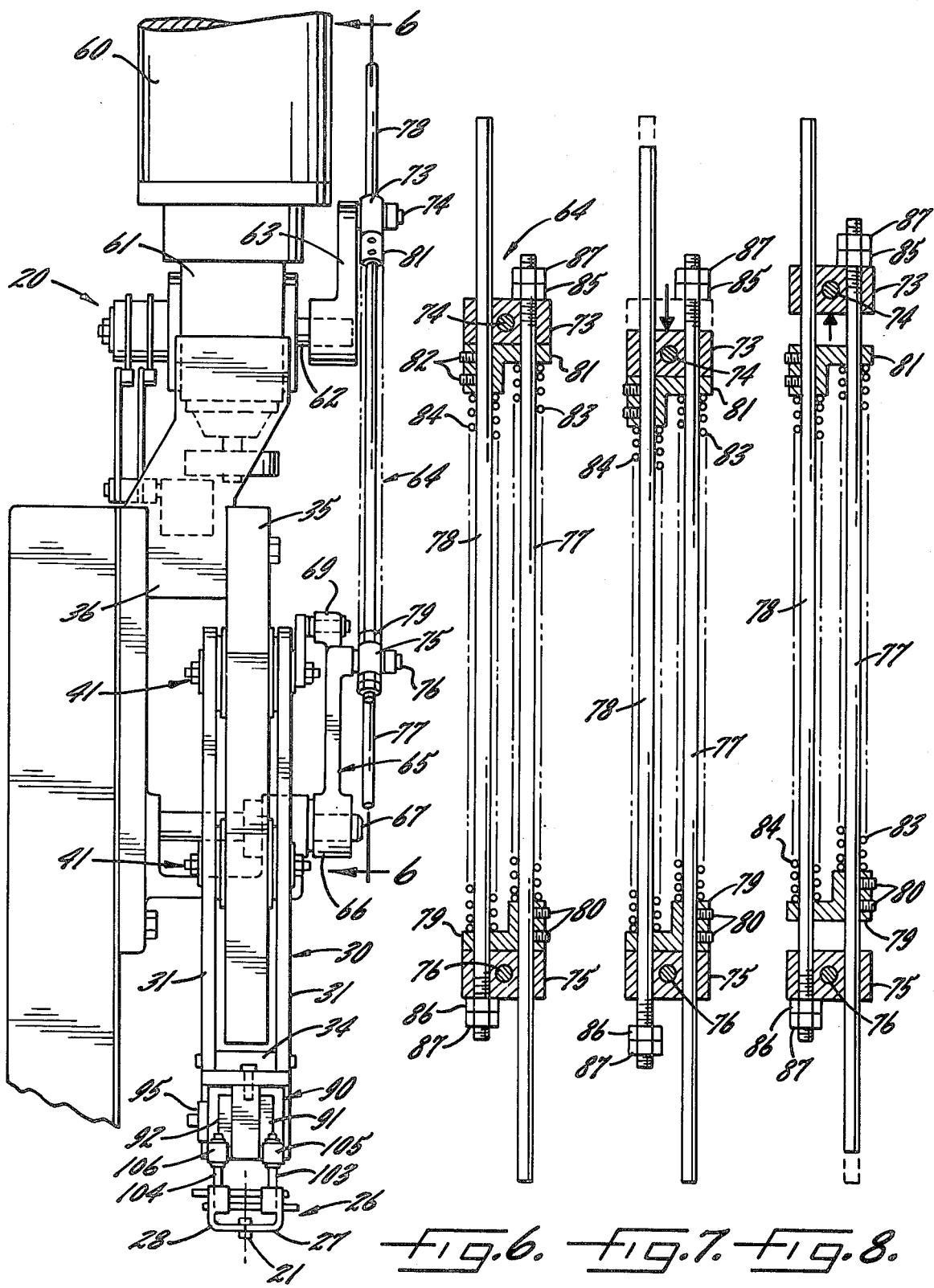

MACHINE FOR HANDLING PARTS

BACKGROUND OF THE INVENTION

This invention relates generally to a machine for handling parts and more specifically relates to a parts handling machine of the same general type as disclosed in Dixon U.S. Pat. No. 4,002,247. In that machine, a gripping mechanism having a pair of opposing jaws is mounted on a carriage and is adapted to be shifted horizontally and vertically to pick a part out of a track and to transfer the part to a different position.

The carriage of the machine disclosed in the Dixon patent is guided for back and forth movement by slots or cam tracks which are formed in a main support plate. Rollers are mounted on the carriage and ride within the tracks. When the carriage is arranged to move horizontally and vertically, each track is shaped substantially as an inverted L and includes a generally horizontal portion and a generally vertical portion. As the carriage moves back and forth, each roller rides around the corner between the horizontal and vertical portions of the track.

Difficulty has been encountered in keeping the rollers positioned tightly within the tracks while leaving the rollers free to roll without skidding. If the rollers are not held tightly within the tracks, the rollers are free to shift radially and thus impair the smoothness and the positioning accuracy of the gripping mechanism. On the other hand, a roller which is closely confined by the track tends to roll along both sides of the track and tends to skid, particularly when the roller moves around the corner of the track.

SUMMARY OF THE INVENTION

The general aim of the present invention is to provide a new and improved parts handling machine of the foregoing type in which each roller is tightly confined against moving radially within the cam track but, at the same time, is constrained to ride along only one side of the track and thus is allowed to roll freely and without skidding.

A more detailed object is to achieve the foregoing by providing a parts handling machine in which each cam track receives a roller assembly having rollers of different diameter, the sides of the track being positioned to prevent radial play of the assembly while allowing each roller to engage only a single side of the track.

A further object of the invention is to provide a unique drive linkage between the carriage and its actuator, the drive linkage being characterized by its ability to yield in either direction of movement and thereby prevent damage to the actuator in the event a jam occurs as the carriage is being advanced or retracted.

Still another object is to provide a novel escapement for holding the parts in the track and for releasing the parts one-by-one to the gripping mechanism. The escapement of the invention includes unique part-holding fingers which allow the jaws of the gripping mechanism to close on the parts in a positive manner, which may be easily removed and replaced, and which may be easily adjusted.

These and other objects and advantages of the invention will become more apparent from the following detailed description when taken in conjunction with the accompanying drawings.

BRIEF DESCRIPTION OF THE DRAWINGS

FIG. 1 is a side elevational view of a new and improved parts handling machine embodying the unique features of the present invention.

FIG. 2 is a view similar to FIG. 1 but shows certain parts of the machine in moved positions.

FIG. 3 is a fragmentary front elevational view of the machine as taken substantially along the line 3—3 of FIG. 1.

FIG. 4 is a cross-section taken substantially along the line 4—4 of FIG. 1.

FIG. 5 is an enlarged fragmentary cross-section taken substantially along the line 5—5 of FIG. 1.

FIG. 6 is an enlarged cross-section taken substantially along the line 6—6 of FIG. 3 and shows the yieldable linkage between the gripping mechanism and its actuator.

FIG. 7 is a view similar to FIG. 6 but shows the linkage yielding in one direction.

FIG. 8 also is a view similar to FIG. 6 but shows the linkage yielding in the opposite direction.

DETAILED DESCRIPTION OF THE PREFERRED EMODIMENT

Figure 9:
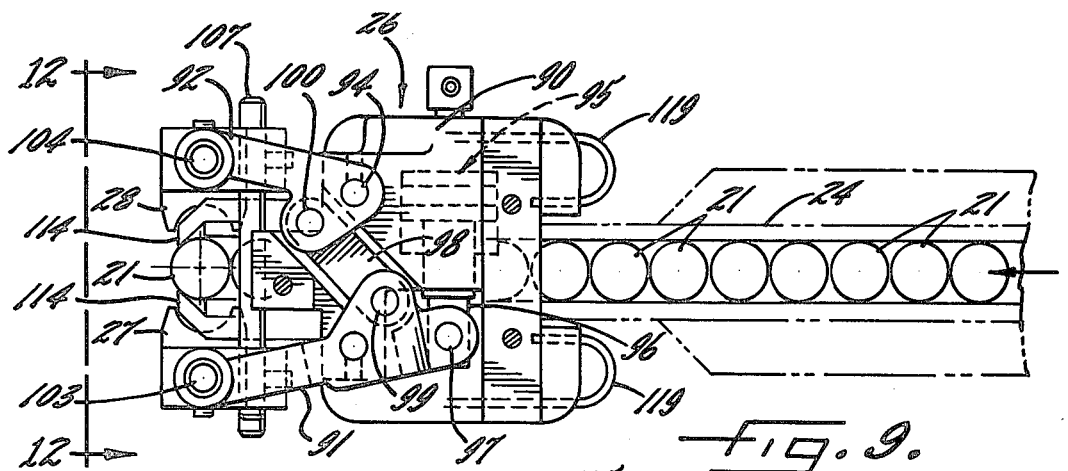
FIGS. 9 and 10 are enlarged fragmentary cross-sections taken substantially along the lines 9—9 and 10—10, respectively, of FIG. 1.

As shown in the drawings for purposes of illustration, the invention is embodied in a parts handling machine 20 for transferring parts 21 one at a time from a loading station 22 to a delivery station 23 which, in this instance, is spaced outwardly and downwardly from the loading station. The exemplary parts 21 (FIGS. 9 and 12) which have been illustrated are in the form of cylindrical studs adapted to move in a row along a vibratory track 24 which is inclined downwardly and outwardly.

Each stud 21 which moves to the loading station 22 adjacent the outer end of the track 24 is picked up by a gripping mechanism 26 having a pair of opposing jaws 27 and 28 (FIGS. 3 and 12) adapted to close upon and release the stud. After the jaws grip the stud in the loading station, the gripping mechanism is shifted outwardly and then downwardly to place the stud in a workpiece 29 (FIG. 2) in the delivery station 23. The jaws then release the stud and thereafter the gripping mechanism is shifted upwardly and then inwardly to return the jaws to the loading station preparatory to the jaws closing on the next part in the loading station. Thus, the gripping mechanism shifts between the loading and delivery stations along a path which is substantially in the shape of an inverted L.

The gripping mechanism 26 is mounted on the lower end of a movable carriage 30 (FIGS. 1 and 4) which herein is formed by a pair of laterally spaced plates 31 disposed in vertical planes. At their lower ends, the plates are connected by screw 33 to an end plate 34 which supports the gripping mechanism 26. The two plates 31 are located on opposite sides of a main support member 35 (FIGS. 4 and 5) which is fixed to and extends downwardly and outwardly from an upstanding column 36 (FIG. 1).

Two identical cam tracks 37 (FIG. 1) are defined in the main support member 35, one of the tracks being located upwardly and inwardly from the other truck. Each cam track is shaped substantially as an inverted L and includes a generally horizontal portion 38 and a generally vertical, downwardly extending portion 39 located at the outer end of the horizontal portion and merging with the latter by way of a radiused corner portion 40. The carriage 30 is guided for movement by the cam tracks and thus imparts the requisite outward, downward and upward-inward motion to the gripping mechanism 26.

To support the carriage 30 and cause the carriage to follow the cam tracks 37, upper and lower roller assemblies 41 (FIG. 4) are connected to the carriage and extend into the tracks. The two roller assemblies are virtually identical to one another, there being one roller assembly associated with each track.

In accordance with one aspect of the present inention, the cam tracks 37 and the roller assemblies 41 uniquely coact with one another to prevent radial play of the roller assemblies within the tracks while permitting the roller assemblies to roll freely along the tracks without skidding. As a result, the carriage 30 may move the gripping mechanism 26 freely between the stations 22 and 23 without the roller assemblies creating drag and yet, at the same time, the roller assemblies are confined tightly within the tracks to prevent back and forth bouncing of the carriage and to insure precise positioning of the gripping mechanism in each station.

More specifically, each roller assembly 41 herein comprises a rod or axle 42 (FIG. 4) which extends through the side plates 31 of the carriage 30 and through the cam track 37 in the support member 35. Each axle is supported within bushings 43 in the side plates and is retained by nuts 44 on the ends of the axle. The axles, the bushings and the nuts help secure the side plates to one another.

In carrying out the invention, each axle 42 supports coaxial rollers 45 and 46 (FIG. 5) having different diameters. In the present instance, there are two outboard rollers 45 of the same diameter and a single center roller 36 of a larger diameter. Each roller herein is a ball bearing having a ring of balls located between inner and outer races. An enlarged diameter hub 47 preferably is formed on the midportion of the axle to support the center roller 46.

Further in carrying out the invention, each cam track 37 is arranged such that the outboard rollers 45 engage only one side of the track while the center roller 46 engages only the other side of the track. As shown in FIG. 5, each cam track is defined in part by a slot 48 which is formed through the main support member 35. The upper and outer wall 49 of the slot defines the upper and outer side of the cam track and engages the peripheral surfaces of both outboard rollers 55. The peripheral surface of the larger center roller 46, however, does not contact the wall 49 of the slot 48. Such lack of contact is achieved by forming a groove 50 in the wall 49, the groove being located in alinement with the center roller 46. Also, the lower and inner wall 51 of the slot 48 is spaced from and does not contact the left roller 45 shown in FIG. 5.

The lower and inner side of each cam track 37 preferably is defined by the lower and inner edges 52 (FIG. 5) of a cam plate 53 which is secured to the main support member 35 by three cap screws 54 extending through counterbored holes 55 in the cam plate and threaded into tapped holes 56 in the main support member. The edge 52 of the cam plate 53 engages the large diameter center roller 46 but does not engage either of the smaller outboard rollers 45. The large center roller 46 holds the right roller 45 shown in FIG. 5 out of contact with the edge 52 of the cam plate 53 and holds the left roller 45 out of engagement with the lower and inner wall 51 of the slot 48.

With the foregoing arrangement, the outboard rollers 45 contact only the surface or wall 49 which defines upper and outer side of the cam track 37 while the center roller 46 contacts only the surface or edge 52 which defines the lower and inner side of the track. As a result, each roller rolls freely with the outboard rollers turning in one direction and with the center roller turning in the opposite direction as the carriage 30 is shifted to move the gripping mechanism 26 from, for example, the loading station 22 to the delivery station 23. There is no possibility of any roller simultaneously contacting both sides of the track 37 and thus the rollers cannot skid. In prior arrangements, skidding has particularly been a problem as the rollers move around the corner portions 40 of the tracks and, with the present arrangement, this problem is completely eliminated.

Although the rollers 45 and 46 each contact only one side of each cam track 37, the cam track prevents the rollers and the axle 42 from moving radially or bouncing back and forth. Thus, the outboard rollers 45 bear against the wall 49 to prevent the axle from shifting upwardly when the rollers are in the horizontal portion 38 of the track and from shifting outwardly when the rollers are in the vertical portion 39 of the track. At the same time, the center roller 46 bears against the edge 52 to prevent the axle from shifting downwardly when the rollers are in the horizontal portion 38 of the track and from shifting upwardly when the rollers are in the vertical portion 39 of the track. Rocking of the axle is prevented by virtue of the rollers 45 engaging the wall 49 at positions located on opposite sides of the rollers 46 and by virtue of the roller 46 engaging the edge 52 at a position located between the rollers 45. Accordingly, the axles are prevented from bouncing and rocking within the tracks even through no roller contacts both sides of the track. The carriage 30 thus is held tightly on the support member 35 to insure smooth and bounce-free operation and to insure precise positioning of the gripping mechanism 26.

The cam plate 53 is preferably adjustable to enable the rollers 45 to snugly engage the wall 49 and to enable the roller 46 to snugly engage the edge 52 in spite of allowable tolerances in the rollers and the track 37. For this purpose, the counterbored holes 55 (FIG. 5) in the cam plate 53 are significantly larger in diameter than the diameters of the heads and the shanks of the cap screws 54. As a result, the screws 54 may be temporarily loosened and then the cam plate 53 may be shifted vertically and horizontally relative to the support member 35 to the extent necessary to cause the edge 52 to bear against the roller 46 and to cause the latter roller to act through the axle 42 and press the rollers 45 against the wall 49. In this way, tolerances may be taken up to insure that the rollers tightly engage the sides of the track.

The gripping mechanism 26 is adapted to be shifted back and forth between the loading and delivery stations 22 and 23 by an electric motor 60 (FIG. 1) which is supported on the upper end portion of the column 36 and which acts through a speed reducer 61. The output shaft 62 (FIG. 3) of the speed reducer serves to rotate a radially extending crank arm 63 which is connected to the upper end of a drive linkage mechanism 64. The lower end of the drive linkage, in turn, is connected to a bellcrank 65. The bellcrank includes a central hub 66 which is pivotally mounted on the colum 36 at 67, a first radiating arm 68 which is connected to the drive linkage, and a second radiating arm 69 which is pivotally connected at 70 at one end of a link 71. The other end of the link 71 is pivotally connected to one end portion of the axle 42 of the upper roller assembly 41 as shown in FIG. 4.

As the shaft 62 of the speed reducer 61 turns through one half revolution, the crank arm 63 pushes on the drive linkage 64 and causes the bellcrank 65 to pivot counterclockwise (FIG. 1) and act through the link 71 and the carriage 30 to push the gripping mechanism 26 outwardly and then downwardly from the loading station 22 to the delivery station 23. During the other half revolution of the shaft 62, the crank arm 63 pulls on the drive linkage 64 to pivot the bellcrank clockwise, the bellcrank in turn acting through the link 71 and the carriage 30 to pull the gripping mechanism 26 upwardly and then inwardly from the delivery station 23 to the loading station 22.

In accordance with another aspect of the invention, the drive linkage 64 is uniquely constructed to yield if the gripping mechanism 26 or the carriage 30 should happen to jam either when the gripping mechanism is being pushed outwardly and downwardly or when the gripping mechanism is being pulled upwardly and inwardly. Being capable of yielding in either direction, the linkage protects the motor 60, the speed reducer 61 and the crank 63 against damage if a jam occurs no matter which direction the gripping mechanism might be moving at the time of the jam.

As shown in FIG. 6, the drive linkage 64 includes an upper pivot block 73 which constitutes a driving member and which is pivotally connected to the crank arm 63 by a horizontal pivot pin 74. Spaced below the upper blank 73 is a lower pivot block 75 which constitutes a driven member, the lower block being connected pivotally to the arm 68 of the bellcrank 65 by a horizontal pivot pin 76. Two side-by-side rods 77 and 78 extend slidably through holes formed in each of the blocks 73 and 75.

A first generally L-shaped stop 79 (FIG. 6) is secured rigidly to the lower end portion of the rod 77 by set screws 80 and slidably receives the rod 78. The stop 79 normally engages the upper side of the lower pivot block 75. A second generally L-shaped stop 81 is secured rigidly to the upper end portion of the rod 78 by set screws 82 and slidably receives the rod 77. The stop 81 normally engages the lower side of the upper pivot block 73.

Two coil springs 83 and 84 are telescoped over the rods 77 and 78, respectively. The springs are compressed between the stop elements 79 and 81 with corresponding ends of the springs bearing against different portions of each stop element.

The drive linkage 64 is completed by third and fourth stops which are in the form of nuts 85 and 86. The nut 85 is threaded onto the upper end portion of the rod 77 and normally engages the upper side of the upper pivot block 73 while the nut 88 is threaded onto the lower end portion of the rod 78 and normally engages the lower side of the blocks 75. Lock nuts 87 also are threaded onto the rods and are jammed against the nuts 85 and 86.

The normal position of the drive linkage 64 under non-jam conditions is shown in FIG. 6. As shown, the springs 83 and 84 urge the lower stop 79 downwardly into engagement with the lower block 75, urge the lower block 75 downwardly into engagement with the lower nut 86, urge the upper stop 81 upwardly into engagement with the upper block 73 and urge the upper block 73 upwardly into engagement with the upper nut 85. The lower stop nut 86 limits movement of the lower block 75 away from the upper block 73 while the upper stop nut 85 limits movement of the upper block away from the lower block.

When the upper block 73 is moved downwardly to advance the carriage 30, the upper block pushes against the stop 81 which acts through the spring 83 to force the stop 79 downwardly. As long as there is no jam, the spring 83 acts substantially as a rigid link and pushes the lower block 75 downwardly in unison with the upper block 73. As an incident thereto, the lower block acts through the nut 86 and the rod 78 to pull the stop 81 downwardly, the spring 84 remaining substantially in its normal condition and also acting substantially as a rigid link.

As the carriage 30 is advanced, various factors might cause a jam tp occur. For example, the stud 21 might jam against the workpiece 29, a foreign object may obstruct the gripping mechanism 26 or a foreign object may lodge in one of the cam tracks 37. If a jam occurs during the advance stroke, further downward movement of the lower block 75 is stopped while the upper block 73 continues to move downwardly. Under such circumstances, the upper block 73 pushes against the stop 81 which, in turn, pushes against the springs 83 and 84. The springs yield to allow the stop 81 to move toward the blocked stop 79 and, at the same time, the block 73 and the stop 81 slide downwardly on the rod 77 while the rod 78 slides downwardly within the stop 79 and the block 75 (see FIG. 7). Accordingly, the upper block 73 is allowed to move downwardly relative to the stopped lower block 75 so as to prevent the crank arm 63, the speed reducer 61 and the motor 60 from locking up and being damaged.

As the upper block 73 is moved upwardly to retract the carriage 30, the upper block pushes against the nut 85 which, in turn, pulls the rod 77 upwardly. The rod 77 acts through the stop 79 and the spring 84 to move the stop 81 upwardly, the spring 84 acting substantially as a rigid link. The rod 78 moves upwardly with the stop 81 and causes the nut 86 to pull the block 75 upwardly and thereby retract the carriage 30. During the retract stroke, the parts of the linkage 64 remain positioned substantially as shown in FIG. 6 as long as there is no jam.

A jam may occur during the retract stroke if, for example, a foreign object lodges in one of the cam tracks 37. If such a jam occurs, the lower block 75 is stopped while the upward force on the upper block 73 is maintained. As the upper block is forced upwardly, it simply slides upwardly along the rod 78 and moves away from the stop 81 (see FIG. 8). At the same time, the upper block 73 pushes upwardly against the nut 85 which pulls on the rod 77 and causes the rod to slide upwardly within the stop 81 and the block 75. The rod 77 pulls the stop 79 upwardly away from the stopped lower block 75 and, as an incident thereto, the springs 83 and 84 yield to permit the stop 79 to move upwardly relative to the blocked stop 81. Thus, the linkage 64 is capable of yielding during the retract stoke of the carriage 30 as well as during the advance stroke.

The gripping mechanism 26 is of the same general type as disclosed in my copending application Ser. No. 306,205, filed Sept. 28, 1981 and entitled Parts Handling Machine. Briefly, the gripping mechanism includes a main body 90 (FIGS. 1 and 9) which is detachably secured to the lower side of the end plate 34 of the carriage 30. Two levers 91 and 92 (FIG. 9) are pivotally connected to the body by vertical pivot pins 93 and 94. The lever 93 is adapted to be pivoted back and forth by a pneumatically operated actuator 95 on the body 90, the actuator having a reciprocating rod 96 which is pivotally connected to the lever 91 at 97. An equalizer link 98 is pivotally connected to the levers 91 and 92 at 99 and 100, respectively, and causes the lever 92 to pivot through the same angular distance as the lever 91 but in the opposite direction.

Figures 12, 13:
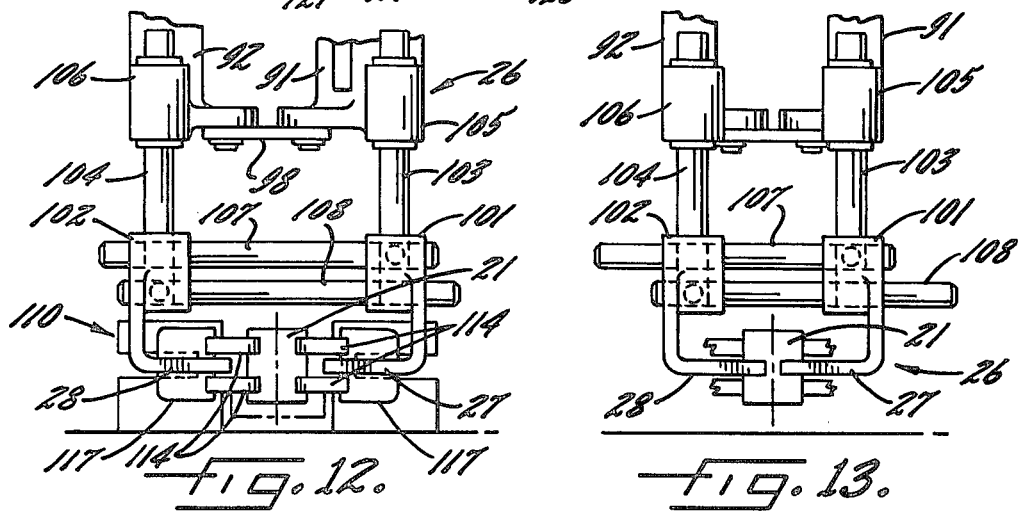
FIG. 12 is a fragmentary front elevational view as taken substantially along the line 12—12 of FIG. 9.
FIG. 13 is a fragmentary front elevational view as taken substantially along the line 13—13 of FIG. 11.

As shown in FIG. 12, the jaws 27 and 28 of the gripping mechanism 26 include upper mounting ears 101 and 102 which are secured to vertical rods 103 and 104. The rods, in turn, are rotatably supported within tubular sleeves 105 and 106 on the forward end portions of the levers 91 and 92. An upper horizontal rod 107 is secured rigidly to the mounting ear 101 of the jaw 27 and extends slidably through the mounting ear 102 of the jaw 28 while a lower horizontal rod 108 is secured rigidly to the mounting ear 102 and extends slidably through the ear 101.

With the foregoing arrangement, reciprocation of the rod 96 causes the levers 91 and 92 to pivot back and forth. As the levers pivot, the jaws 27 and 28 move toward and away from one another between open positions (FIG. 12) and closed positions (FIG. 13). The rods 107 and 108 confine the jaws to move toward and away from one another with straight line motion, such motion being permitted by virtue of the rods 103 and 104 being rotatable relative to the levers 91 and 92.

Figure 10:
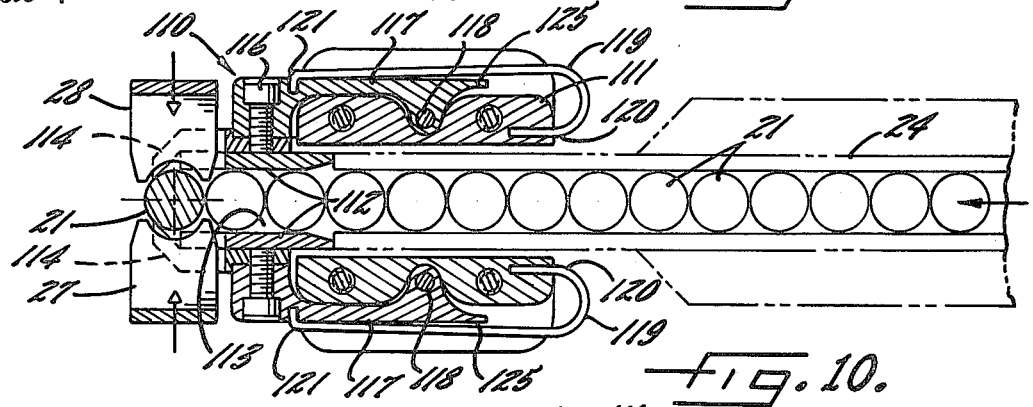

An escapement 110 (FIG. 10) is located at the outer end of the track 24 and releases the studs 21 one-by-one to the jaws 27 and 28 of the gripping mechanism 26. The present invention contemplates the provision of a new and improved escapement 110 which is simple in construction, which allows the jaws to close positively upon the parts 21 and which may be easily changed over to accommodate different types of parts.

Specifically, the escapement 110 includes a generally U-shaped support block 111 (FIG. 10) which underlies the track 24 and which straddles the sides of the track. Two vertical plates 112 are mounted on the block 111 and define a throat 113 which forms an extension of the track 24.

Figure 11:
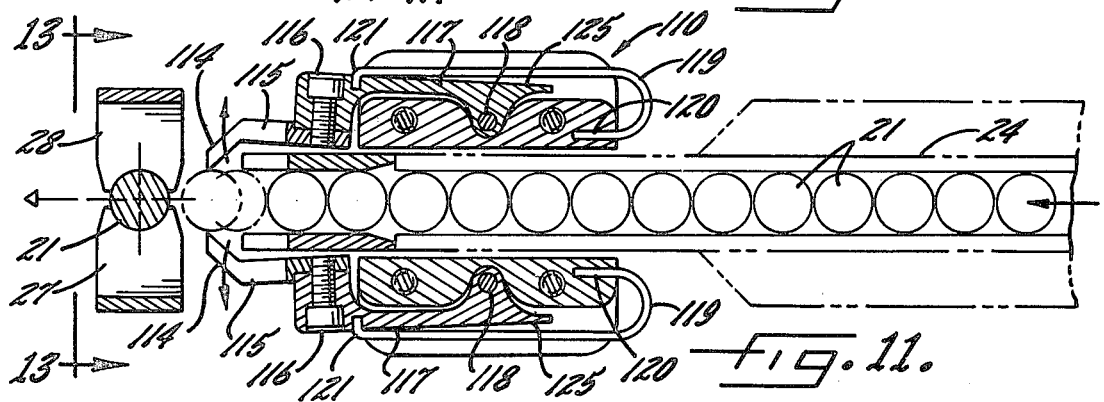
FIG. 11 is a view similar to FIG. 10 but shows certain parts in moved positions.

In carrying out the invention, each stud 21 which progresses to the outer end of the throat 113 is held releasably therein by a pair of opposing fingers 114 (FIG. 11). Herein, each finger is formed with a slot 115 which extends between the sides of the finger and which opens out of the outer end of the finger. The fingers are detachably secured by screws 116 to the outer end portions of levers 117 which are pivotally connected to the block 111 by vertical pins 118. Round-wire springs 119 (FIG. 11) are connected to the levers and bias the levers in a direction closing the fingers. Each spring includes an inner tang 120 which is hooked into a hole in the inner end of the block 111 and further includes an outer tank 121 which is hooked into a hole in the outboard side of the lever 117.

The springs 119 normally hold the fingers 114 in closed positions (FIGS. 9, 10 and 12) in which the fingers engage the stud 21 in the throat 113 and prevent the stud from moving outwardly. When the jaws 27 and 28 are positioned in the loading station 22, the jaws close with straight line motion and, as an incident thereto, the jaws ove laterally through the slots 115 in the fingers. The slots thus enable the jaws to grip the midportion of the stud 21 and to obtain a positive hold on the stud (see FIG. 13).

After being closed, the jaws 27 and 28 are shifted outwardly toward the delivery station 23. During such shifting, the jaws move outwardly through the outer ends of the slots 115 in the fingers 114 and pull the gripped stud 21 out of the throat 113. The stud cams against the fingers and causes the fingers to pivot to their open positions and release the stud (see FIG. 11). Immediately thereafter, the springs 119 snap the fingers back to their closed positions to retain the next stud in the throat 113.

The fingers 114 can be easily removed from the levers 117 and replaced with different fingers for handling different types of parts. In addition, the round-wire springs 119 can be easily removed and replaced with springs of a different spring rate for causing the fingers to effectively hold different parts. When the fingers open, ears 125 (FIG. 11) on the inner ends of the levers 117 move toward the sides of the block 111 and, if something causes the fingers to open abnormally wide, the ears engage the block to stop further opening of the fingers and thereby prevent overstressing of the springs.

I claim:

1. A parts handling machine comprising a support, a carriage movable back and forth on said support and having means operable to pick up a part at a loading station and to release the part at a delivery station spaced from said loading station, said support having a cam track with opposing walls defining the path of movement of said carriage, a rod on said carriage, first and second coaxial rollers rotatably mounted on said rod and located within said track, said first and second rollers engaging one wall of said track and being free of engagement with the other wall of said track, a third roller rotatably mounted on said rod between said first and second rollers and located within said track, and said third roller engaging said other wall of said track and being free of engagement with said one wall of said track whereby said rollers prevent radial play of said rod between the walls of said track and whereby each roller rides along only a single wall of said track as said carriage moves back and forth.

2. A parts handling machine as defined in claim 1 in which a groove is formed in said one wall of said track in alinement with said third roller, said groove causing said one wall of said track to be spaced from said third roller.

3. A parts handling machine as defined in claim 2 in which the outer diameter of said third roller is greater than the outer diameters of said first and second rollers, said third roller coacting with said other wall to hold said first and second rollers out of engagement with said other wall.

4. A parts handling machine as defined in either of claims 1 or 3 in which said other wall of said track is defined by one edge of a plate, and means adjustably securing said plate to said support and selectively permitting said one edge of said plate to be moved toward and away from said one wall.

5. A parts handling machine comprising a support, a carriage movable back and forth on said support and having means operable to pick up a part at a loading station and to release the part at a delivery station spaced outwardly and downwardly from the loading station, said support having first and second cam tracks, each of said cam tracks having a substantially horizontal leg and having a substantially vertical leg projecting downwardly from the outer end of the horizontal leg, each of said tracks having opposed walls defining the path of movement of said carriage, first and second spaced rods on said carriage and extending into said first and second tracks, respectively, a set of three coaxial rollers rotatably mounted on each rod and located within the respective track, two rollers of each set engaging one wall of the associated track and being spaced radially from the other wall of such track, and the third roller of each set being disposed between said two rollers, being located in engagement with said other wall of the associated track, and being spaced radially from said one wall whereby each set of rollers prevents radial play of the associated rod between the walls of the respective track and whereby each roller rides along only a single wall as said carriage moves back and forth.

6. A parts handling machine as defined in claim 5 in which the outer diameter of the third roller of each set is greater than the outer diameters of the other two rollers of the set.

* * * * *